Patented June 8, 1954

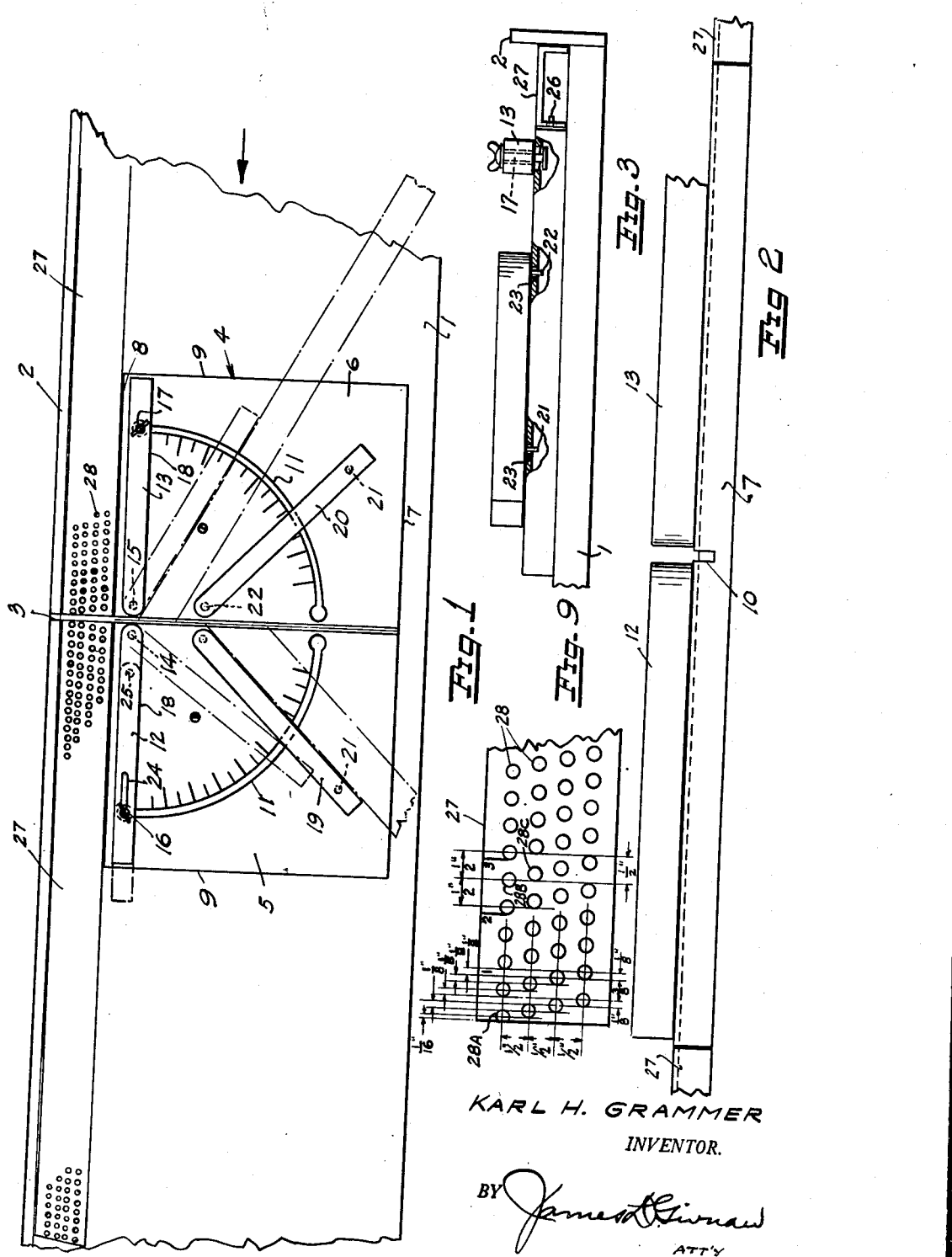
Karl H. Grammer
INVENTOR.

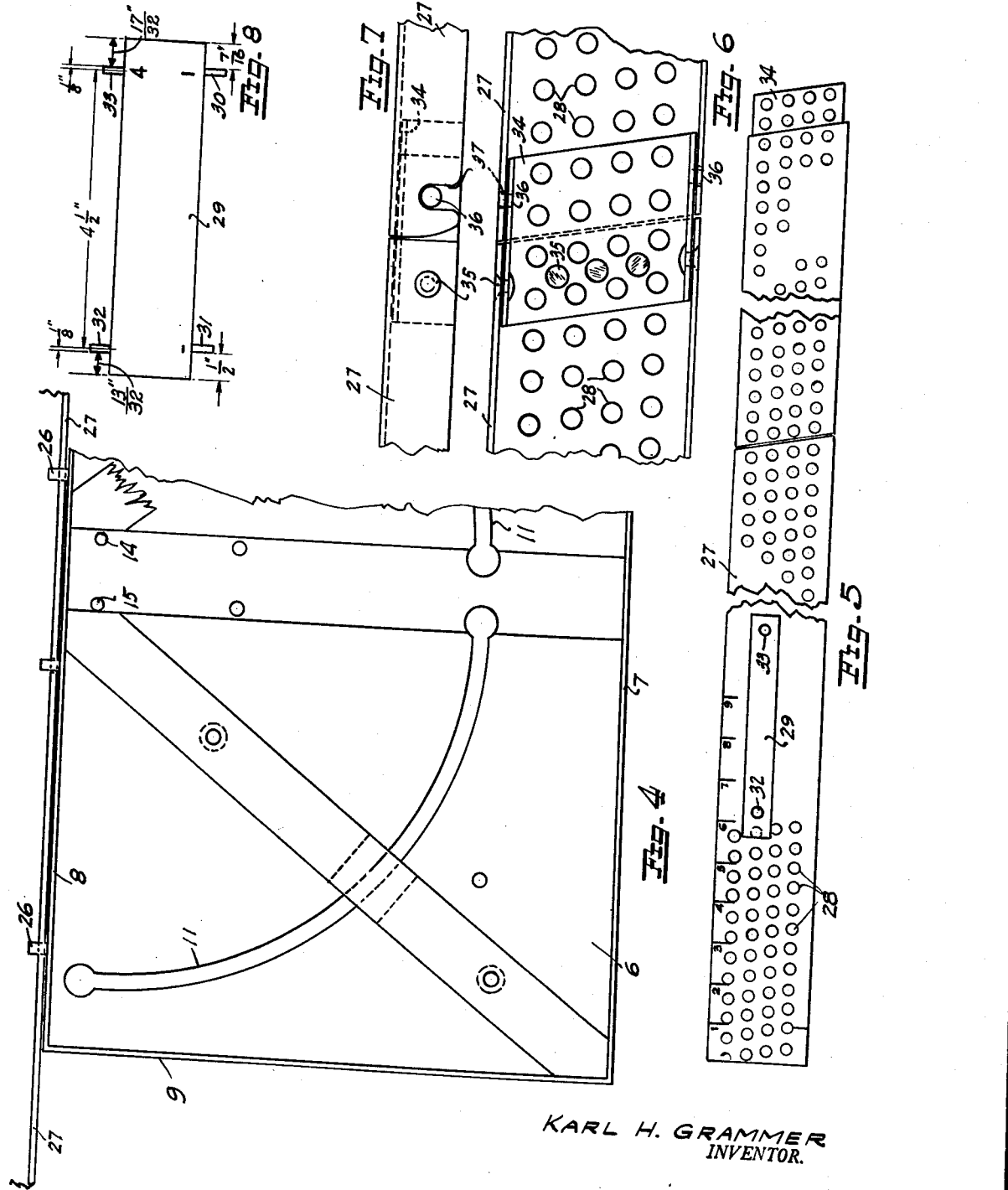

2,680,458

UNITED STATES PATENT OFFICE 2,680,458

MEASURING, BEVELING, AND MITERING DEVICE FOR POWER-DRIVEN CUTOFF SAWS

Karl H. Grammer, Portland, Oreg., assignor of twenty-four and one-half per cent to George E. Whitmore and twenty-four and one-half per cent to Roy D. Smith, both of Portland, Oreg.

Application May 10, 1950, Serial No. 161,162

1 Claim. (Cl. 143—168)

This invention relates to improvements in wood working tools and more particularly to a measuring, beveling and mitering device for use with power-driven cut off saws.

It is one of the principal objects of the invention to provide a tool of this character which is of simple, efficient, durable construction readily adaptable to work benches for sawing operations and which is positive in its operation through a wide range of adjustment for cutting work pieces on any desired angle ranging from zero to ninety degrees and also for presenting the work to the saw in any pre-determined lengths.

These and other objects will appear as my invention is more fully hereinafter described in the following specification, illustrated in the accompanying drawings and finally pointed out in the appended claim.

In the drawings:

Figure 1 is a top plan view of a measuring, beveling and mitering device for power-driven cut off saws made in accordance with my invention and shown applied to work bench of which I have shown a fragment.

Figure 2 is an enlarged fragmentary side elevation of Figure 1.

Figure 3 is an enlarged end elevation of Figure 1 looking in the direction of the arrow applied to Figure 1.

Figure 4 is an enlarged bottom plan view of one side of Figure 1 in which both sides are identical.

Figure 5 is a fragmentary plan view of measuring elements shown in Figure 1 for presenting the material to the saw to be cut into desired lengths.

Figure 6 is an enlarged obverse plan view of the means shown in Figure 5.

Figure 7 is an edgewise view of Figure 6.

Figure 8 is a side elevation of a limit stop in the form of a block adapted for engagement with the measuring elements.

Figure 9 is a fragmentary plan view of one end of a measuring element showing dimensions applied to the apertures therein.

Referring now more particularly to the drawings:

With particular reference to Figures 1 and 2, reference numeral 1 indicates a work table or work bench provided with a vertical back wall 2 in more or less the conventional manner. The back wall 2 is vertically slotted as at 3 to permit transverse passage of a swing saw or horizontal saw in its movement toward a work piece laid upon a work plate generally indicated at 4 and made up of two sections 5 and 6 which may be made separately and joined together by means of a spacer strip, or as shown in Figure 2 made of a single sheet of metal having vertical front, rear and end walls 7, 8 and 9 respectively and wherein the top wall or working surface of the work plate is divided by a slot or channel 10 to allow free passage of the saw entirely across the work plate. As both sections are identical with each other, a description of one will suffice for both. Each section is formed with an arcuate slot 11 graduated in degrees of a circle ranging from zero to eighty degrees as shown. Guide elements 12 and 13 are pivotally mounted at their inner ends as at 14 and 15 respectively to their respective sections 5 and 6 of the work plate. Each guide element is adapted to swing about its pivot point throughout the entire range of degrees of the semicircle as shown and may be locked in any selected position by means of a locking screw 16 extending through the guide 12 and the slot 11 in section 5 and also a locking screw 17 extending through said slot in the section 6. By this arrangement the guiding edge 18 of the guide elements may be locked in any angular relation to the channel or slot 10 through which the swinging or horizontal saw passes in its cutting operation. Both guide elements 12 and 13 when locked in alignment in the full line positions shown in Figure 1 form a guiding edge parallel to the rear edge of the workplate to guide a workpiece therealong at right angles to the channel 10 to receive the saw cut.

Removably secured to the sections 5 and 6 in a fixed angular relation of 45 degrees to the channel 10 and 90 degrees with respect to each other are two guiding elements 19 and 20 which are removably secured to said section by means of pins 21 and 22 carried by the guiding elements and adapted for insertion into apertures 23 formed in the top wall or working surface of the sections 5 and 6 (see Fig. 3).

The guiding element 12 is formed with an elongated slot 24 through which the locking bolt 16 extends and by means of which the guiding element 12 may be moved to the dotted line position shown where it is held by the pin 14 entering an aperture 25 formed in the working surface of the section 5 and whereby a gap between the inner ends of the guides 12 and 13 is provided for the passage of spaced apart routing saws (not shown). The rear wall 8 of the work plate is provided with spaced apart horizontal pins 26 for the purpose of engaging with and accurately positioning a plurality of aligned measuring sections of channel elements generally indicated at 27, apertured as at 28 and graduated in inches for co-operation with a limit stop in the form of a block 29 having pins extending upwardly and downwardly therefrom for engagement with said apertures in the channel elements to serve as an abutment for lumber to be cut by the saw as it passes through the gap between the innermost ends of said channel elements where said gap aligns with the gap 10 of the work plate which separates the sections 5 and 6 of the work plate.

The block 29 is provided with pins 30, 31, 32 and 33 spaced inwardly from the ends of the block in accordance with the dimensions applied thereto in Figure 8. Both upper and lower pairs of pins are spaced apart an equal distance of four and one-half inches from center to center. Each pin is spaced inwardly a different distance from the adjacent end of the block and the spacement of each pin from the adjacent end of the block is fractionally correlated with the fractional spacement of the apertures 28 to enable any fractional setting, along with any inch setting, of the block on the measuring side portion, defined by the upper surfaces of the channel elements, to be achieved.

With particular reference to Figure 9 it will be noted that the apertures 28 in each channel member are arranged in parallel longitudinal rows spaced one-half inch apart and in diagonal rows across the channel section also spaced one-half inch apart. The fragmentary end section of the channel element shown in Figure 9 corresponds with the right hand end of the channel element shown in Figure 1 and wherein its end is cut at right angles to the side walls of the channel element. This also applies to the channel element on the left hand side of Figure 1 and a gap is provided for the passage of the saw between the ends of said channel elements. In order to provide proper clearance for the passage of the saw blade and at the same time measure accurately between the side of the saw blade and said apertures in the channel elements, I center the first aperture 28A one-sixteenth of an inch inward from the end of the channel element and the remaining apertures in the diagonal row are each offset one-eighth of an inch. Thus the one-half inch space between the apertures in each longitudinal parallel row may be divided into adjustments of one-eighth inch each for the block 29. Each aperture is one-fourth inch in diameter as are the pins 30, 31, 32 and 33 in the block 29 shown in Figure 8. Assuming that it is desired to cut off a portion of a workpiece two inches in length, the block 29 would be placed with the pin 31 extending into the aperture 28B and with the pin 30 into an aperture spaced four and one-half inches from the center of the aperture 28B. Thus the forward end of the block 29 would form an abutment precisely at one edge of the aperture directly below the two inch graduation mark as shown. If a length of material is to be cut off at two and one-eighth inches, the pin 31 in the block 29 would be inserted in the aperture 28C in the next row and so on across the channel member where application of the block to the last longitudinal row will locate the abutment at two and three-eighths inches. Then if the distance between the end of the block and the cutoff mark is to be further reduced in fractions of inches, the other pins 30, 32 and 33 may be inserted in the apertures in like manner.

As best illustrated in Figure 5 the channel sections may be of any desired length and joined together in end-to-end relationship by means best illustrated in Figures 6 and 7 and including an underlying channel section 34 permanently secured by rivets 35 to one end of one channel section 27 and extending forwardly therefrom for engagement by means of pins 36 adapted to be frictionally engaged within slots 37 formed in the adjacent end of the next section.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

A measuring work supporting device for use with a saw comprising a saw table having a flat longitudinal work supporting surface provided with a transverse slot to receive a saw edge for passage thereof through a work piece resting longitudinally on the supporting surface, measuring means positioned longitudinally of one side of the supporting surface and including a side portion of the table having its upper surface formed with vertical apertures, said apertures being spaced apart longitudinally and transversely in inches and fractions thereof, and an abutment block, having squared ends, adjustably mounted on the side portion with the ends paralleling the slot, said block having surfaces provided with projecting pins of a diameter substantially equal to the diameter of the apertures within which the pins seat, said pins projecting laterally from such surfaces of the block adjacent the ends thereof and being spaced different distances from the adjacent ends of the block, such spacing of the pins from the ends of the block being correlated with the spacement of the apertures so that the block may be placed at desired fractional settings on the side portion whereby the block can be secured on the side portion at a point spaced inches and fractions of inches from the slot dependent upon the length of the cut to be made in a work piece which has one of its ends abutting the end of the block facing the slot.

References Cited in the file of this patent

UNITED STATES PATENTS

| Number | Name | Date |
|---|---|---|
| 146,403 | Rowland | Jan. 13, 1874 |
| 354,811 | Roy | Dec. 21, 1886 |
| 702,043 | Zika | June 10, 1902 |
| 831,277 | Garland | Sept. 18, 1906 |
| 1,667,191 | Chapin | Apr. 24, 1928 |
| 1,799,605 | Sodergren | Apr. 7, 1931 |
| 1,799,606 | Sodergren | Apr. 7, 1931 |
| 2,452,544 | Brodie | Nov. 2, 1948 |

FOREIGN PATENTS

| Number | Country | Date |
|---|---|---|
| 22,406 | Australia | Sept. 14, 1929 |